United States Patent
Murakami

(10) Patent No.: US 6,243,485 B1
(45) Date of Patent: Jun. 5, 2001

(54) METHOD AND APPARATUS FOR RECOGNIZING IRRADIATION FIELDS ON RADIATION IMAGES

(75) Inventor: Masayuki Murakami, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/041,025

(22) Filed: Mar. 12, 1998

(30) Foreign Application Priority Data

Mar. 12, 1997 (JP) .................................... 9-057382

(51) Int. Cl.[7] .................................................. G06K 9/00
(52) U.S. Cl. ........................ 382/132; 250/492.1; 378/64
(58) Field of Search .................... 382/128–132, 382/181, 209, 218, 266, 282, 298, 299, 308, 190, 199, 214, 219, 242; 250/370.09, 492.1, 492.3; 264/473, 488; 378/46, 63, 98.11, 140, 64; 423/718; 424/9.4; 427/551, 595; 604/20; 702/8, 172; 376/342, 103; 606/33

(56) References Cited

U.S. PATENT DOCUMENTS

| | | | |
|---|---|---|---|
| 4,851,678 | 7/1989 | Adachi et al. ................ | 250/327.2 |
| 4,967,079 | 10/1990 | Shimura ........................ | 250/327.2 |
| 5,048,105 | * 9/1991 | Adachi .......................... | 382/300 |
| 5,072,384 | * 12/1991 | Doi et al. ..................... | 382/132 |
| 5,526,442 | * 6/1996 | Baba et al. ................... | 382/132 |
| 5,668,889 | * 9/1997 | Hara ............................. | 382/132 |
| 5,673,332 | * 9/1997 | Nishikawa et al. ........... | 382/128 |
| 5,761,334 | * 6/1998 | Nakajima et al. ............ | 382/132 |
| 5,841,148 | * 11/1998 | Some et al. .................. | 250/584 |
| 5,917,469 | * 6/1999 | Matsushita ................... | 345/115 |
| 5,953,465 | * 9/1999 | Saotome ....................... | 382/300 |
| 5,970,164 | * 10/1999 | Bamberger et al. .......... | 382/128 |

* cited by examiner

Primary Examiner—Jayanti K. Patel
(74) Attorney, Agent, or Firm—Sughrue, Mion, Zinn, Macpeak & Seas, PLLC

(57) ABSTRACT

An image size reducing process is carried out on an original radiation image represented by an original image signal, and a reduced image signal representing a reduced image is thereby obtained. A process for recognizing the irradiation field is carried out on the reduced image signal representing the reduced image, which has been obtained from the reducing process, and a temporary irradiation field contour is thereby detected. An enlarging process is then carried out in order to enlarge the temporary irradiation field contour to a size corresponding to the size on the original radiation image, and an enlarged temporary irradiation field contour is thereby obtained. A degree of conformity of the enlarged temporary irradiation field contour to the original radiation image is evaluated by use of a predetermined evaluation function. An irradiation field contour, which has the highest degree of conformity, is determined in accordance with the results of the evaluation.

6 Claims, 5 Drawing Sheets

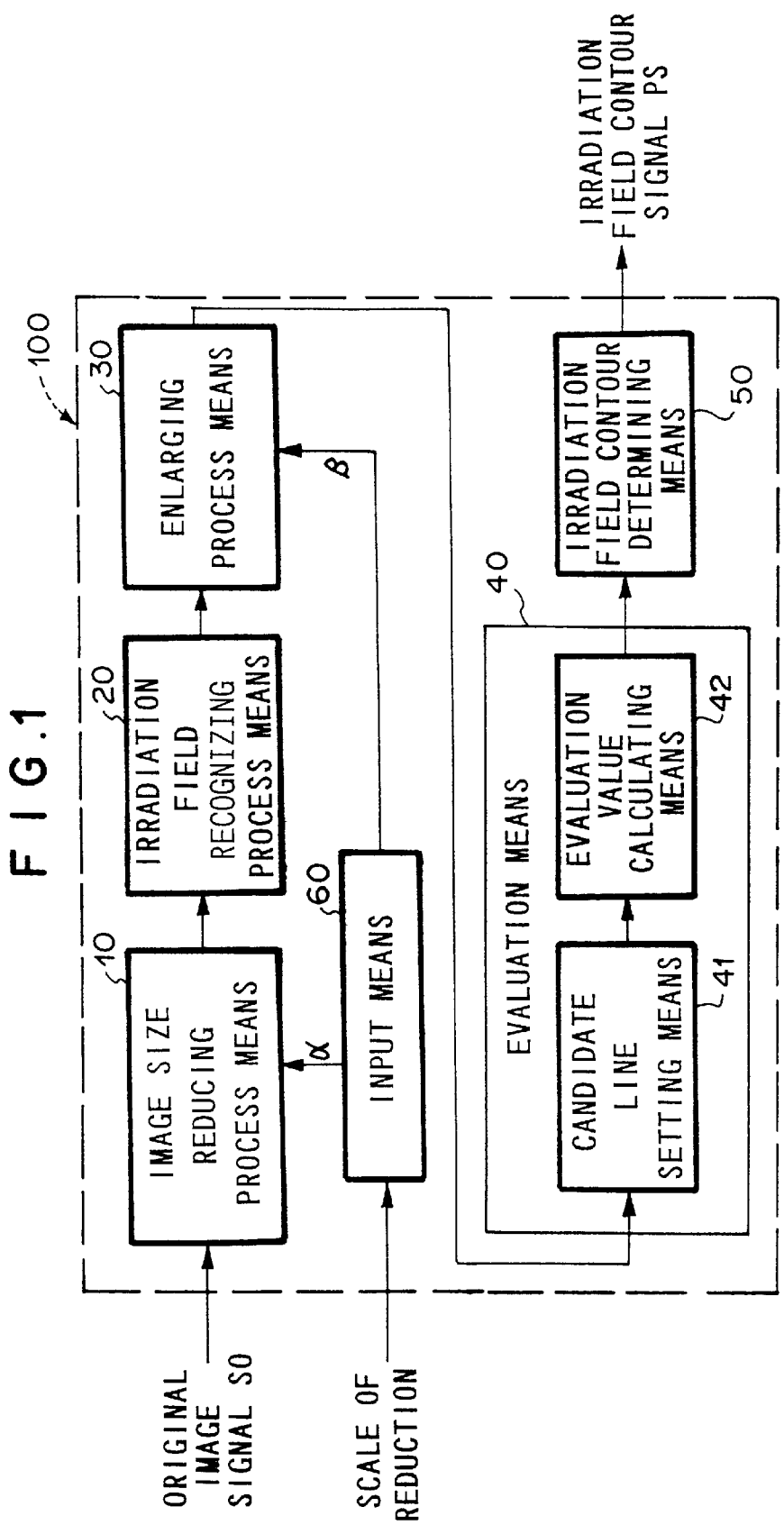

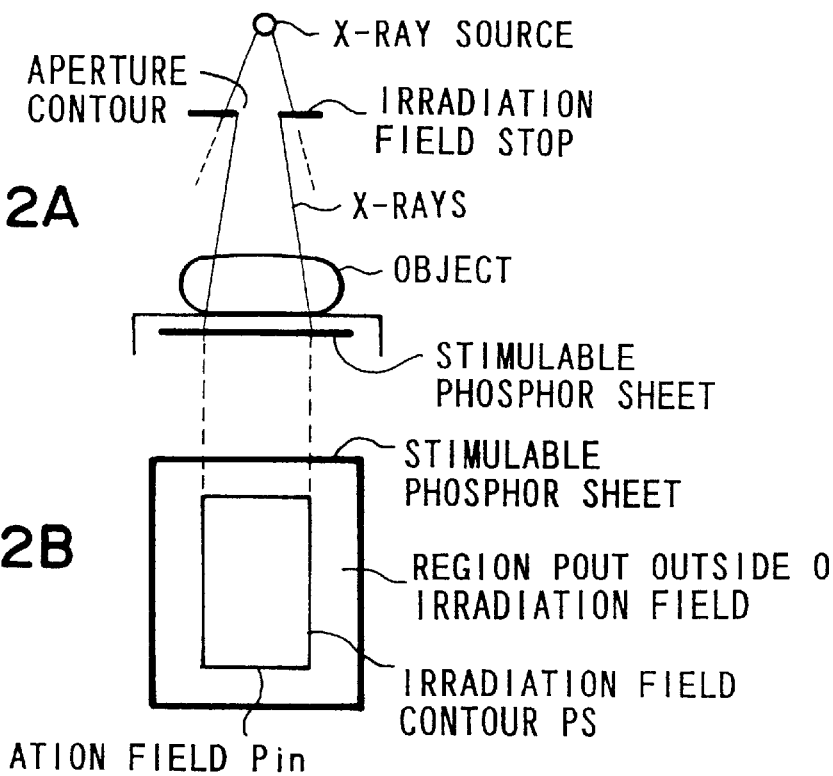
FIG. 2A
FIG. 2B
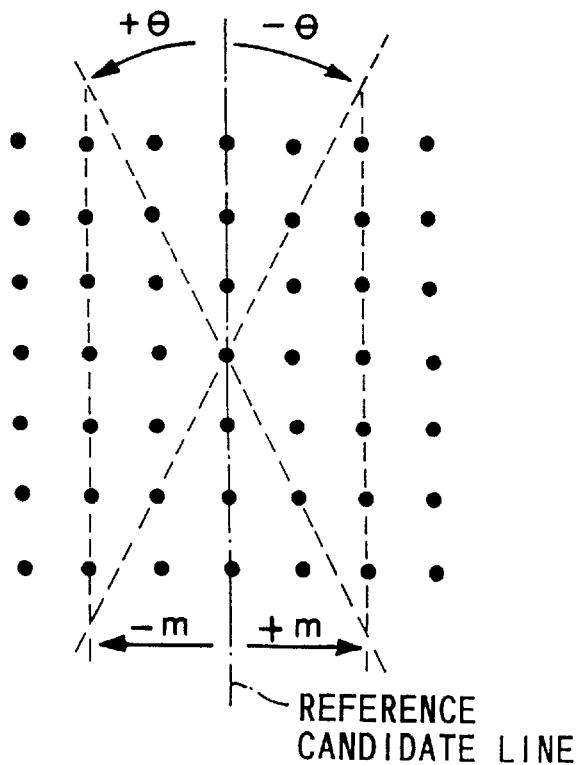
FIG. 3

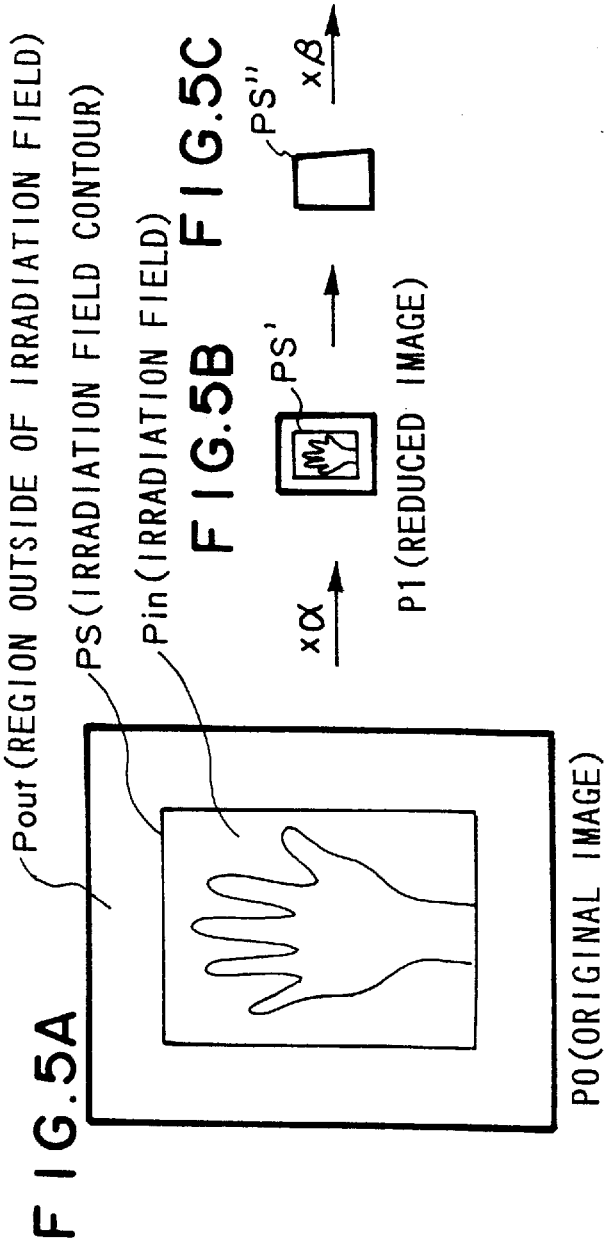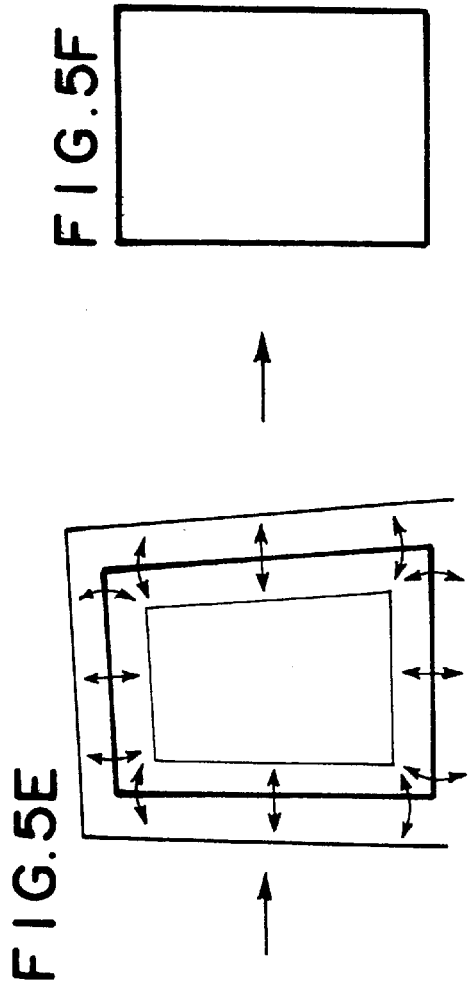

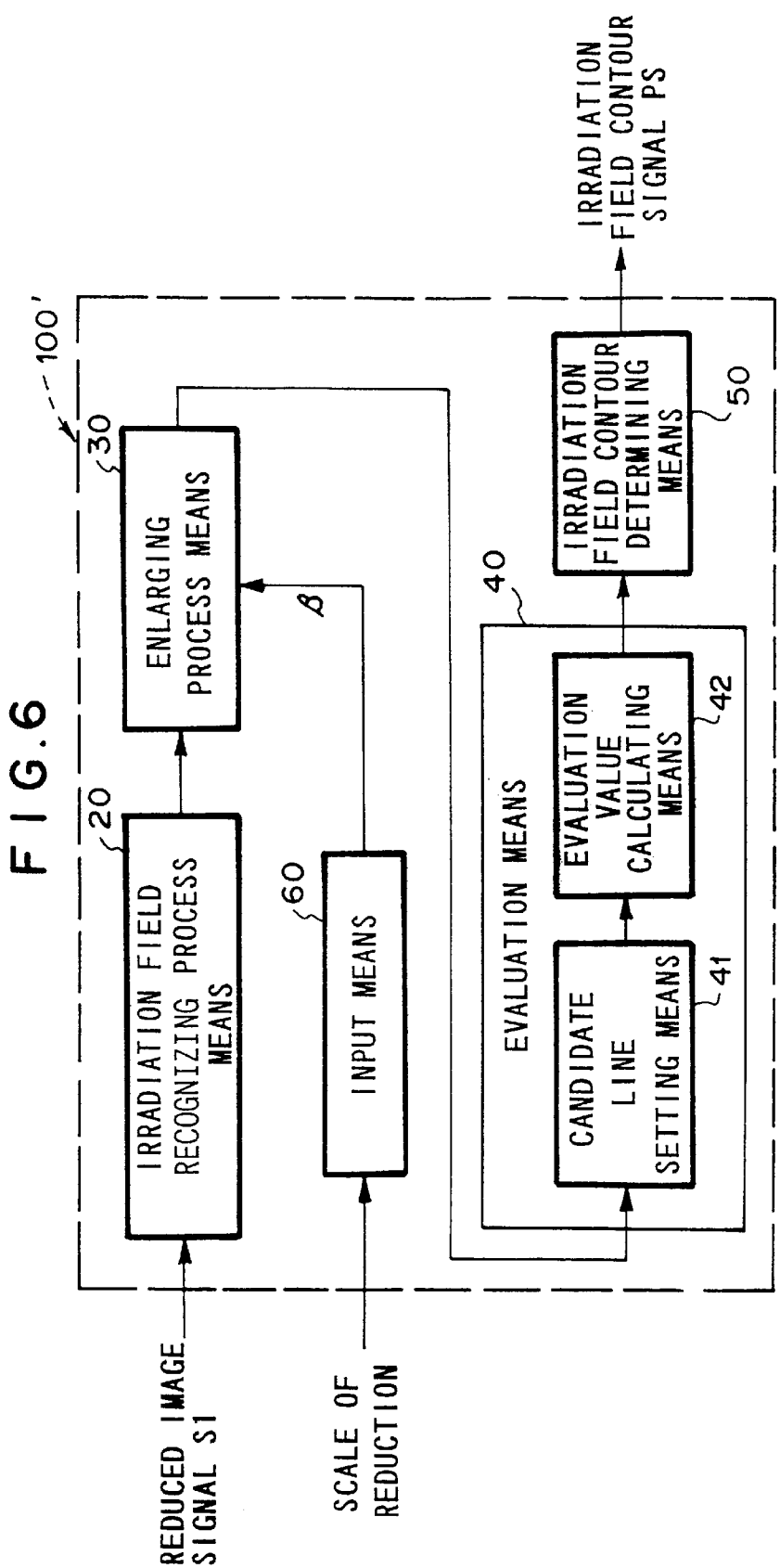

METHOD AND APPARATUS FOR RECOGNIZING IRRADIATION FIELDS ON RADIATION IMAGES

BACKGROUND OF THE INVENTION

1. Field of the Invention

This invention relates to a method of recognizing an irradiation field on a radiation image, and an apparatus for carrying out the method.

2. Description of the Prior Art

Techniques for reading out a recorded radiation image in order to obtain an image signal, carrying out appropriate image processing on the image signal, and then reproducing a visible image having good image quality by use of the processed image signal have heretofore been known in various fields. For example, as such techniques, the applicant proposed various radiation image recording and reproducing systems which use stimulable phosphor sheets.

When a radiation image of an object, such as a living body, is recorded on a recording medium, such as X-ray film or a stimulable phosphor sheet, it is desirable that adverse effects of radiation upon the living body can be kept as small as possible. Also, if object portions not related to a diagnosis, or the like, are exposed to radiation, the radiation will be scattered by such portions to the portion that is related to a diagnosis, or the like, and the image quality will be adversely affected by the scattered radiation. Therefore, when a radiation image is recorded on the recording medium, an irradiation field stop made from lead, or the like, is often used in order to limit the irradiation field to an area smaller than the overall recording region of the recording medium, such that radiation may be irradiated only to that portion of the object, the image of which is to be used.

In cases where a radiation image is recorded on a recording medium, such as a stimulable phosphor sheet, by using an irradiation field stop, an image of an object, or the like, is recorded in a region (i.e., an irradiation field) inward from the aperture contour of the irradiation field stop. Also, a region outward from the aperture contour of the irradiation field stop (i.e., a region outside of the irradiation field) is not exposed to the radiation. Therefore, an irradiation field contour on the image, which contour corresponds to the aperture contour of the irradiation field stop, constitutes edge lines in the image.

In cases where an image signal is detected from the recording medium, on which an image has been recorded within only the irradiation field, and image processing is carried out on the image signal the image processing, such as gradation processing, may be carried out on only the image signal components of the image signal, which correspond to the region inside of the irradiation field. In this manner, the amount of the processing can be reduced markedly, the load of the processing can be kept small, and the processing speed can be kept high.

The region outside of the irradiation field is not exposed to the radiation. Therefore, in cases where the image is a negative image recorded on medical X-ray film, the image density of the region outside of the irradiation field becomes approximately lowest on the image. By way of example, when the medical X-ray film is set on a viewing screen and the transmission image is seen with light produced by a fluorescent lamp, the region having the lowest image density becomes the very bright region. Therefore, in particular, the portion of the irradiation field which is close to the region outside of the irradiation field, cannot be seen clearly due to dazzling effects of the bright region outside of the irradiation field.

Accordingly, in the radiation image recording and reproducing systems, a process for forcibly replacing the image signal values, which correspond to the region outside of the irradiation field, by image signal values representing the highest level of image density is carried out. The process is ordinarily referred to as the blackening process. In cases where the blackening process is carried out, the boundary line between the region, on which the blackening process is carried out, and the region, on which the blackening process is not carried out, coincides with the irradiation field contour on the radiation image. Therefore, it is necessary for the irradiation field contour to be recognized accurately in accordance with the image signal.

The irradiation field contour can be recognized by, for example, utilizing the characteristics in that the irradiation field contour constitutes the edge lines in the image, and finding a portion, at which the value of the image signal changes sharply.

Various techniques for determining the edge lines have heretofore been proposed. For example, with a technique proposed in U.S. Pat. No. 4,851,678, the edge lines corresponding to a rectangular aperture contour of an irradiation field stop are determined by (a) processing a radiation image signal, which represents a radiation image, along the horizontal direction of the radiation image, edge candidate points constituting an edge line being thereby detected, (b) totaling the thus detected edge candidate points along the vertical direction, the position of the edge line, which extends along the vertical direction, with respect to the horizontal direction being thereby found, (c) processing the radiation image signal along the vertical direction, edge candidate points constituting an edge line being thereby detected, and (d) totaling the thus detected edge candidate points along the horizontal direction, the position of the edge line, which extends along the horizontal direction, with respect to the vertical direction being thereby found. With a technique proposed in U.S. Pat. No. 4,967,079, the edge lines are determined by (a) detecting an edge candidate point from image signal values corresponding to positions along each of a plurality of radial directions, which extend from a predetermined point lying within the irradiation field toward ends of the radiation image, a plurality of edge candidate points being thereby detected with respect to the plurality of the radial directions, and (b) connecting the adjacent edge candidate points.

However, as for radiation images used for medical purposes, the number of picture elements constituting a single radiation image, i.e. the number of components of the image signal representing the single radiation image, is as large as $4 \times 10^6$ (=2,000 picture elements×2,000 picture elements). Therefore, considerable time has heretofore been required to carry out the process for recognizing an irradiation field on the radiation image.

SUMMARY OF THE INVENTION

The primary object of the present invention is to provide a method of recognizing an irradiation field on a radiation image, wherein the time required to carry out a process for recognizing an irradiation field is kept to be markedly short, and the accuracy, with which the irradiation field is recognized, is kept to be equivalent to the accuracy of a conventional technique for recognizing an irradiation field.

Another object of the present invention is to provide an apparatus for carrying out the method of recognizing an irradiation field on a radiation image.

A method and apparatus for recognizing an irradiation field on a radiation image in accordance with the present invention are characterized by carrying out a reducing process on an original radiation image, which is to be subjected to a process for recognizing an irradiation field, the number of picture elements in the radiation image being thereby reduced, and thereafter carrying out the process for recognizing the irradiation field, the time required to carry out the process for recognizing the irradiation field being thereby kept to be markedly short. The method and apparatus for recognizing an irradiation field on a radiation image in accordance with the present invention are further characterized by enlarging an irradiation field contour, which has been obtained from the process for recognizing the irradiation field, to a size corresponding to the size on the original radiation image, and carrying out evaluation of the irradiation field recognition, in which the enlarged irradiation field contour is taken as a reference irradiation field contour and image signal values representing neighboring picture elements are utilized, errors due to the reducing process and the enlarging process being thereby compensated for. The accuracy, with which the irradiation field is recognized, is thereby kept to be equivalent to the accuracy of a conventional technique for recognizing an irradiation field.

Specifically, the present invention provides a method of recognizing an irradiation field on a radiation image, in which an original image signal representing an original radiation image is obtained, the original radiation image having been recorded by use of an irradiation field stop and having an irradiation field thereon, and a process for recognizing the irradiation field is carried out, the irradiation field being recognized in accordance with the original image signal, the method comprising the steps of:

i) carrying out an image size reducing process on the original radiation image represented by the original image signal, a reduced image signal representing a reduced image being thereby obtained, ii) carrying out the process for recognizing the irradiation field, the process being carried out on the reduced image signal representing the reduced image, which has been obtained from the reducing process, a temporary irradiation field contour being thereby detected, iii) carrying out an enlarging process for enlarging the temporary irradiation field contour to a size corresponding to the size on the original radiation image before being subjected to the reducing process, an enlarged temporary irradiation field contour being thereby obtained, iv) evaluating a degree of conformity of the enlarged temporary irradiation field contour to the original radiation image by use of a predetermined evaluation function, and v) determining an irradiation field contour, which has the highest degree of conformity, in accordance with the results of the evaluation.

The term "image size reducing process" as used herein means a process, with which the number of image signal components of the original image signal is reduced. By way of example, the image size reducing process may be a process for thinning out the image signal components of the original image signal, or a process for calculating arithmetic mean values of the image signal components of the original image signal and thereafter carrying out a thinning-out operation. From the viewpoint of comparison with the time required to carry out the processing with the conventional method of recognizing an irradiation field, the scale of reduction in the image size reducing process, expressed in terms of the area ratio, should preferably be at most $1/16$ (i.e., at most $1/4$ in each of the horizontal and vertical directions). Also, from the viewpoint of keeping the information representing the irradiation field contour on the reduced image, which is obtained from the image size reducing process, the scale of reduction in the image size reducing process, expressed in terms of the area ratio, should preferably be at least $1/1,600$ (i.e., at least $1/40$ in each of the horizontal and vertical directions).

The term "reduced image signal representing a reduced image having been obtained from an image size reducing process" as used herein means the image signal made up of a reduced number of image signal components.

In the method of recognizing an irradiation field on a radiation image in accordance with the present invention, the process for recognizing the irradiation field is carried out on the reduced image signal representing the reduced image, which has been obtained from the image size reducing process, and the temporary irradiation field contour is thereby detected. As the process for recognizing the irradiation field, which is carried out on the reduced image signal representing the reduced image, one of various techniques may be employed. For example, known techniques, such as the technique proposed in U.S. Pat. No. 4,851,678 or the technique proposed in U.S. Pat. No. 4,967,079, may be employed. As described above, with the technique proposed in U.S. Pat. No. 4,851,678, the edge lines corresponding to a rectangular aperture contour of an irradiation field stop are determined by (a) processing a radiation image signal, which represents a radiation image, along the horizontal direction of the radiation image, edge candidate points constituting an edge line being thereby detected, (b) totaling the thus detected edge candidate points along the vertical direction, the position of the edge line, which extends along the vertical direction, with respect to the horizontal direction being thereby found, (c) processing the radiation image signal along the vertical direction, edge candidate points constituting an edge line being thereby detected, and (d) totaling the thus detected edge candidate points along the horizontal direction, the position of the edge line, which extends along the horizontal direction, with respect to the vertical direction being thereby found. With the technique proposed in U.S. Pat. No. 4,967,079, the edge lines are determined by (a) detecting an edge candidate point from image signal values corresponding to positions along each of a plurality of radial directions, which extend from a predetermined point lying within the irradiation field toward ends of the radiation image, a plurality of edge candidate points being thereby detected with respect to the plurality of the radial directions, and (b) connecting the adjacent edge candidate points.

The term "enlarging process" as used herein means the process for enlarging the temporary irradiation field contour to a size corresponding to the size on the original radiation image before being subjected to the reducing process. Specifically, the detected temporary irradiation field contour is the one on the reduced image and cannot be processed as the one on the original radiation image (before being subjected to the image size reducing process). Therefore, it is necessary for the temporary irradiation field contour, which has been detected on the reduced image, to be enlarged to a size corresponding to the size on the original radiation image. As the enlarging process, one of various techniques may be employed. From the viewpoint of simplicity of calculation processing, or the like, as the enlarging process, a transforming process should preferably be employed, in which the coordinate system corresponding to the reduced image is multiplied by the reciprocal of the scale of reduction such that the coordinate system may correspond to the coordinate system of the original radiation image. With the transforming process, the entire area of the reduced image need not necessarily be transformed, and only the coordinate points necessary for specifying each line constituting the irradiation field contour may be transformed.

More specifically, in cases where the irradiation field contour is constituted of straight lines alone, it is sufficient for the coordinates of a starting point of each line and the coordinates of an end point of each line to be multiplied by the reciprocal of the scale of reduction. By way of example, a single line constituting the irradiation field contour may be specified by a starting point having the coordinates (5, 10) and an end point having the coordinates (40, 21) on the coordinate system corresponding to the reduced image, and the scale of reduction may be 1/9. In such cases, with the enlarging process, only the coordinates (5, 10) of the starting point and the coordinates (40, 21) of the end point are multiplied by the reciprocal (=9) of the scale of reduction, and a starting point having the coordinates (45, 90) and an end point having the coordinates (360, 189) are thereby obtained.

In the enlarging process, the scale of enlargement is set in accordance with the scale of reduction and should be set such that the product of the scale of enlargement and the scale of reduction may be equal to 1. Specifically, the scale of enlargement, expressed in terms of the area ratio, should preferably be at least 16 (i.e., at least 4 in each of the horizontal and vertical directions) and should preferably be at most 1,600 (i.e., at most 40 in each of the horizontal and vertical directions).

However, in the present invention, the enlarging process is not limited to the aforesaid process, in which only the temporary irradiation field contour is enlarged to a size corresponding to the size on the original radiation image. Specifically, with the enlarging process, image signal components may be interpolated from the image signal components of the reduced image signal representing the reduced image, the number of the image signal components being thereby increased, and the entire area of the reduced image containing the temporary irradiation field contour may thereby be enlarged to the size corresponding to the original radiation image. As the process for interpolating the image signal components, one of various kinds of interpolating operations may be employed. In cases where a rectangular irradiation field contour is to be detected, since reference candidate lines constituting the contour are the straight lines, it is sufficient for interpolating operations using linear equations to be employed, and processing requiring large amounts of calculations, such as third-order spline interpolating operations, need not necessarily be employed. In cases where a circular-arc or curved-line irradiation field contour is to be detected, various appropriate interpolating operations, such as circular-arc or spline interpolating operations, may be employed.

In cases where the interpolating process is carried out with respect to the entire area of the reduced image, the load of the calculating processing for obtaining the interpolated image signal components becomes large, and a long time is required to carry out the processing. Therefore, ordinarily, as described above, the coordinates of the starting point and the end points of each line constituting the temporary irradiation field contour, and the like, should preferably be simply multiplied by the reciprocal of the scale of reduction, such that the temporary irradiation field contour may be enlarged to the size corresponding to the size on the original radiation image.

The term "degree of conformity of an enlarged temporary irradiation field contour" as used herein means an index value representing the degree, with which the temporary irradiation field contour having been detected with the process for recognizing the irradiation field coincides with the irradiation field contour actually located on the original radiation image. The degree of conformity is evaluated by using the predetermined evaluation function for evaluating how much the temporary irradiation field contour, which has been detected with the process for recognizing the irradiation field, coincides with the irradiation field contour, which is actually located on the original radiation image. By way of example, the predetermined evaluation function may be a function for shifting and/or rotating each of reference candidate lines, which constitute the enlarged temporary irradiation field contour, within the range of ±m picture elements and ±θ degrees around the reference candidate line, thereby setting $\{(2m+1)(2\theta+1)-1\}$ number of transformed candidate lines with respect to each of the reference candidate lines, calculating differentiated values with respect to each candidate line, which is among the reference candidate lines and the transformed candidate lines having been set for the reference candidate lines, and calculating a mean value of the differentiated values with respect to each candidate line, the mean value being taken with respect to the direction, along which the candidate line extends.

Alternatively, the predetermined evaluation function may be a function for shifting and/or rotating each of reference candidate lines, which constitute the enlarged temporary irradiation field contour, within the range of ±m picture elements and ±θ degrees around the reference candidate line, thereby setting $\{(2m+1)(2\theta+1)-1\}$ number of transformed candidate lines with respect to each of the reference candidate lines, finding directions of image density gradient vectors with respect to each candidate line, which is among the reference candidate lines and the transformed candidate lines having been set for the reference candidate lines, and calculating an entropy of the directions of image density gradient vectors with respect to each candidate line, the entropy being taken with respect to the direction, along which the candidate line extends.

In cases where the former function (i.e., the function for calculating the mean value of the differentiated values, which are obtained from differentiation processing) is employed as the evaluation function, it is necessary for correspondence relationship between the degree of conformity and the mean value of the differentiated values to be set such that the degree of conformity may become high as the mean value of the differentiated values becomes large. In cases where the latter function (i.e., the function for calculating the entropy of the directions of image density gradient vectors) is employed as the evaluation function, it is necessary for correspondence relationship between the degree of conformity and the entropy of the directions of image density gradient vectors to be set such that the degree of conformity may become high as the entropy of the directions of image density gradient vectors becomes small.

The value of m and the value of θ should preferably be set such that, for example, m=1 (picture element) and $\theta=1/(x^2+y^2)^{1/2}$ (degree). In this formula, x and y are the values representing the size of the reduced image, which is expressed with the number of picture elements (x picture elements×y picture elements). For example, in cases where the size of the reduced image is 100 picture elements×80 picture elements, x=100 (picture elements), and y=80 (picture elements). Therefore, in such cases, m=1 (picture element), and $\theta=1/(100^2+80^2)^{1/2}=7.8\times10^{-3}$ (degree).

In cases where the scale of reduction falls within the range of 1/18 to 1 (scale of enlargement=1 to 18), the value of the reciprocal of the scale of reduction (i.e., the same value as the scale of enlargement) may be employed as the value of m and the value of θ. For example, in cases where the scale of reduction is 1/9, the reciprocal (=9) of 1/9 may be employed such that m=9 (picture elements) and θ=9 (degrees).

The term "differentiated value with respect to each candidate line" as used herein for the former evaluation function means the value of difference between the image signal components representing two picture elements, which stand facing each other with the candidate line intervening therebetween. A large difference value represents that the difference in image density (or in luminance) between the two picture elements is large, and that an edge in the image lies between the two picture elements. As illustrated in FIG. 4A, a plurality of sets of the two picture elements, which stand facing each other with the candidate line intervening therebetween, are located in the direction, along which the candidate line extends. Therefore, a plurality of differentiated values are obtained with respect to the plurality of the sets of the two picture elements, the sets being located in the direction, along which the candidate line extends. The differentiated values having been obtained with respect to the sets of the two picture elements, the sets being located in the direction, along which the candidate line extends, are added to one another, and the thus calculated sum is divided by the number of the sets of the two picture elements. In this manner, the mean value described above is calculated. A large mean value represents a strong probability that the candidate line will be the actual edge in the radiation image, and the edge, which is associated with the largest difference in image density (or in luminance), is the line constituting the irradiation field contour. Accordingly, the correspondence relationship between the degree of conformity and the mean value of the differentiated values is set such that the degree of conformity may become high as the mean value of the differentiated values becomes large. In this manner, the candidate line, which has the highest degree of conformity, can be determined as the line constituting the actual irradiation field contour.

The term "image density gradient vector with respect to each candidate line" as used herein for the latter evaluation function means the vector directed from each of picture elements, which are located on one side of the candidate line, toward the direction, in which the gradient of the image density (i.e., the value of difference in image signal value) is largest. An index value representing the direction, to which the image density gradient vector is directed, is calculated. As the index value, for example, the sine value (sin θ') of an angle θ', which is made between the direction of the image density gradient vector and the direction that is normal to the candidate line, may be employed. As illustrated in FIG. 4B, with respect to the directions of image density gradient vectors from the picture elements located in the direction, along which the candidate line extends, a histogram of the index values is formed. Thereafter, the entropy, $-\Sigma\{(P_i)\log P_i\}$, is calculated from a probability density $P_i$ of the histogram. A small entropy represents that the directions of image density gradient vectors are directed in the same direction. Therefore, there is a strong probability that the candidate line, which is associated with a small entropy, will be the line constituting the actual irradiation field contour on the radiation image. Accordingly, the correspondence relationship between the degree of conformity and the entropy of the directions of image density gradient vectors is set such that the degree of conformity may become high as the entropy of the directions of image density gradient vectors becomes small. In this manner, the candidate line, which has the highest degree of conformity, can be determined as the line constituting the actual irradiation field contour.

In cases where the function for calculating the entropy is employed as the evaluation function, the evaluation is made in accordance with whether the directions of image density gradient vectors are or are not directed in the same direction. Therefore, the evaluation function utilizing the entropy can be employed only in cases where the lines constituting the irradiation field contour are the straight lines. The evaluation function utilizing the entropy cannot be employed in cases where the lines constituting the irradiation field contour are circular arc lines or curved lines.

The term "image density gradient vector" as used herein is not limited to the cases where the image signal is of the type representing the image density values. The term "image density gradient vector" as used herein broadly embraces the gradient vectors based upon image signals, which represent gray levels and luminous levels, including the image density values and luminance values.

The present invention also provides an apparatus for carrying out the method of determining the shape and location of an irradiation field on a radiation image in accordance with the present invention. Specifically, the present invention also provides an apparatus for recognizing an irradiation field on a radiation image, in which an original image signal representing an original radiation image is obtained, the original radiation image having been recorded by use of an irradiation field stop and having an irradiation field thereon, and a process for recognizing the irradiation field is carried out, the irradiation field being recognized in accordance with the original image signal, the apparatus comprising:

i) an image size reducing process means for carrying out an image size reducing process on the original radiation image represented by the original image signal, a reduced image signal representing a reduced image being thereby obtained, ii) an irradiation field recognizing process means for carrying out the process for recognizing the irradiation field, the process being carried out on the reduced image signal representing the reduced image, which has been obtained from the reducing process, a temporary irradiation field contour being thereby detected, iii) an enlarging process means for carrying out an enlarging process for enlarging the temporary irradiation field contour to a size corresponding to the size on the original radiation image before being subjected to the reducing process, an enlarged temporary irradiation field contour being thereby obtained, iv) an evaluation means for evaluating a degree of conformity of the enlarged temporary irradiation field contour to the original radiation image by use of a predetermined evaluation function, and v) an irradiation field contour determining means for determining an irradiation field contour, which has the highest degree of conformity, in accordance with the results of the evaluation.

By way of example, the evaluation means may comprise:

a) a candidate line setting means for shifting and/or rotating each of reference candidate lines, which constitute the enlarged temporary irradiation field contour, within the range of ±m picture elements and ±θ degrees around the reference candidate line, and thereby setting {(2m+1)(2θ+1)−1} number of transformed candidate lines with respect to each of the reference candidate lines, and b) an evaluation value calculating means for calculating differentiated values with respect to each candidate line, which is among the reference candidate lines and the transformed candidate lines having been set for the reference candidate lines, and calculating a mean value of the differentiated values with respect to each candidate line, the mean value being taken with respect to the direction, along which the candidate line extends.

Alternatively, the evaluation means may comprise:

a) a candidate line setting means for shifting and/or rotating each of reference candidate lines, which constitute the enlarged temporary irradiation field contour, within the range of ±m picture elements and ±θ degrees around the reference candidate line, and thereby setting {(2m+1)(2θ+1)−1} number of transformed candidate lines with respect to each of the reference candidate lines, and b) an evaluation value calculating means for finding directions of image density gradient vectors with respect to each candidate line, which is among the reference candidate lines and the transformed candidate lines having been set for the reference candidate lines, and calculating an entropy of the directions of image density gradient vectors with respect to each candidate line, the entropy being taken with respect to the direction, along which the candidate line extends.

In cases where the former evaluation means (i.e., the evaluation means for calculating the mean value of the differentiated values) is employed, it is necessary for the irradiation field contour determining means to set correspondence relationship between the degree of conformity and the mean value of the differentiated values such that the degree of conformity may become high as the mean value of the differentiated values becomes large. In cases where the latter evaluation means (i.e., the evaluation means for calculating the entropy of the directions of image density gradient vectors) is employed, it is necessary for the irradiation field contour determining means to set correspondence relationship between the degree of conformity and the entropy of the directions of image density gradient vectors such that the degree of conformity may become high as the entropy of the directions of image density gradient vectors becomes small.

The value of m and the value of θ may be set in the same manner as that in the aforesaid method of determining the shape and location of an irradiation field on a radiation image in accordance with the present invention.

With the method and apparatus for recognizing an irradiation field on a radiation image in accordance with the present invention, the image size reducing process is carried out on the original radiation image, which is to be subjected to the process for recognizing the irradiation field, and the number of picture elements constituting the radiation image is thereby reduced. Therefore, the process for recognizing the irradiation field can be carried out on the reduced image signal, which is made up of a smaller number of image signal components than the number of the image signal components of the original image signal. As a result, the time required to carry out the process for recognizing the irradiation field can be kept markedly short.

The temporary irradiation field contour, which is thus detected from the reduced image, is the one detected from the thinned-out image signal. Therefore, the temporary irradiation field contour is not markedly different from the irradiation field contour, which is detected from the original image signal before being thinned out, but does not perfectly coincide with the irradiation field contour, which is detected from the original image signal.

Accordingly, the temporary irradiation field contour is enlarged to a size corresponding to the size on the original radiation image. Thereafter, such that errors with respect to an irradiation field contour, which would be obtained from the original image signal made up of the original number of image signal components, may be reduced, a plurality of candidates for the irradiation field contour are set around the temporary irradiation field contour and within the range, which is considered to contain the true irradiation field contour. Also, with respect to each of the candidates for the irradiation field contour, the predetermined evaluation value, which is indicative of the aforesaid errors, is calculated. Specifically, a candidate for the irradiation field contour, which has the smallest error, has a strong probability of being the true irradiation field contour. Therefore, an optimum candidate is found in accordance with the results of the evaluation and determined as the irradiation field contour. In this manner, the accuracy, with which the irradiation field is recognized, can be kept to be equivalent to the accuracy obtained with the conventional method of recognizing an irradiation field.

With the method and apparatus for recognizing an irradiation field on a radiation image in accordance with the present invention, the process for recognizing the irradiation field is carried out substantially two times. However, in the first process for recognizing the irradiation field, the number of the image signal components constituting the reduced image signal is smaller than the number of the image signal components of the original image signal, and therefore the time required to carry out the process can be kept short in proportion to the ratio of the number of the image signal components. Also, in the second process for recognizing the irradiation field, processing is carried out with respect to the markedly narrow range, which is considered to be errors, around the temporary irradiation field contour. Therefore, even if the time required to carry out the two processes for recognizing the irradiation field and the time required to carry out the image size reducing process and the enlarging process are added together, the processing can be carried out within a markedly shorter time than the processing with the conventional method of recognizing an irradiation field, in which a single process for recognizing the irradiation field is carried out on all of the original image signal representing the original radiation image.

BRIEF DESCRIPTION OF THE DRAWINGS

FIG. 1 is a block diagram showing an embodiment of the apparatus for recognizing an irradiation field on a radiation image in accordance with the present invention, FIG. 2A is a schematic view showing a radiation image recording apparatus, in which an irradiation field stop is utilized, FIG. 2B is a schematic view showing a stimulable phosphor sheet, on which a radiation image has been recorded by use of the irradiation field stop and an irradiation field contour corresponding to an aperture contour of the irradiation field stop has been formed, and which is to be subjected to a process for recognizing the irradiation field carried out by the embodiment of FIG. 1, FIG. 3 is an explanatory view showing how a plurality of candidate lines are set, FIGS. 5A through 5F are explanatory views showing how time series processing is carried out by the embodiment of FIG. 1, and FIG. 6 is a block diagram showing a different embodiment of the apparatus for recognizing an irradiation field on a radiation image in accordance with the present invention.

DESCRIPTION OF THE PREFERRED EMBODIMENTS

Figure 4A:
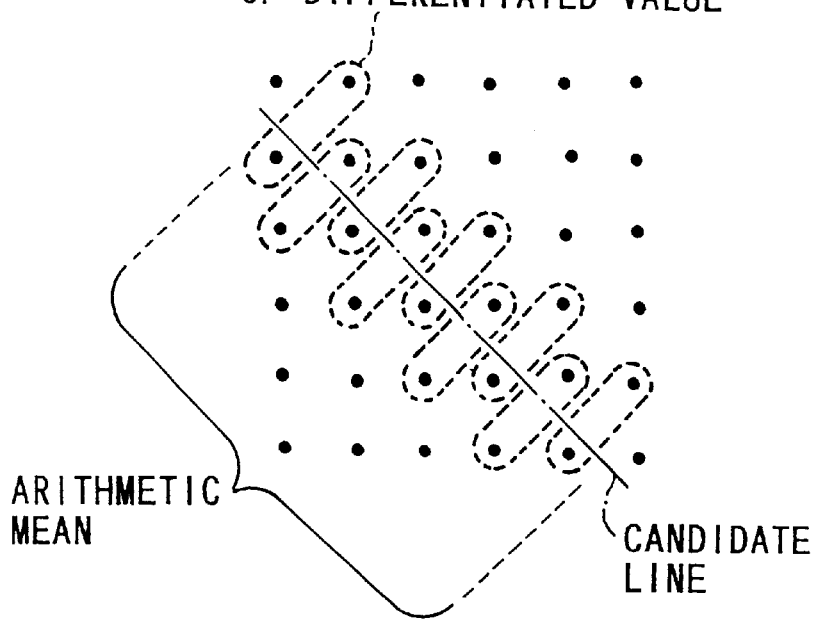
FIG. 4A is an explanatory view showing how a mean value of differentiated values with respect to each candidate line is calculated as an evaluation value.

The present invention will hereinbelow be described in further detail with reference to the accompanying drawings.

FIG. 1 shows an embodiment of the apparatus for recognizing an irradiation field on a radiation image in accordance with the present invention. FIG. 2A shows a radiation image recording apparatus, in which an irradiation field stop is utilized. FIG. 2B shows a stimulable phosphor sheet, on which a radiation image has been recorded by use of the irradiation field stop and an irradiation field contour corresponding to an aperture contour of the irradiation field stop has been formed, and which is to be subjected to a process for recognizing the irradiation field carried out by the embodiment of FIG. 1. FIG. 3 shows how a plurality of candidate lines are set.

A radiation image, which is to be subjected to processing carried out by an irradiation field recognizing apparatus 100 shown in FIG. 1, may be obtained in the manner described below. Specifically, as illustrated in FIG. 2A, an irradiation field stop is located between an X-ray source and an object. The irradiation field stop has a rectangular aperture contour, and its portion outward from the aperture is constituted of a lead plate, which blocks X-rays from impinging upon portions of the object and portions of a stimulable phosphor sheet. In this condition, X-rays are produced by the X-ray source and irradiated to the object. The X-rays pass through the object and then impinge upon the stimulable phosphor sheet. At this time, as illustrated in FIG. 2B, the X-rays do not impinge upon a region Pout on the stimulable phosphor sheet (i.e., a region Pout outside of the irradiation field), which region corresponds to the side outward from the aperture contour of the irradiation field stop. An X-ray image of the object is recorded in a region (i.e., the irradiation field) Pin on the stimulable phosphor sheet, which region corresponds to the side inward from the aperture contour of the irradiation field stop. Also, at the portion of the stimulable phosphor sheet, which portion corresponds to the aperture contour of the irradiation field stop, an irradiation field contour PS is formed. The irradiation field contour PS has a (rectangular) shape approximately identical with the shape of the aperture contour of the irradiation field stop and is constituted of four edge lines, at which the image density changes sharply.

In the manner described above, a radiation image (hereinbelow referred to as the original image) PO is stored on the stimulable phosphor sheet. The stimulable phosphor sheet, on which the original image PO has been stored, is fed into a radiation image read-out apparatus (not shown), which may be of the known type. In the radiation image read-out apparatus, the original image PO is read out from the stimulable phosphor sheet, and an original digital image signal SO representing the original image PO is thereby obtained. The original image signal SO is fed into the irradiation field recognizing apparatus 100 shown in FIG. 1.

The irradiation field recognizing apparatus 100 comprises an image size reducing process means 10 for carrying out an image size reducing process on the original image PO, which is represented by the received original image signal SO, by thinning out the image signal components of the original image signal SO at predetermined intervals. A reduced image signal S1 representing a reduced image P1 is obtained from the image size reducing process means 10. The irradiation field recognizing apparatus 100 also comprises an irradiation field recognizing process means 20 for detecting an irradiation field contour PS' on the reduced image P1, which irradiation field contour corresponds to the irradiation field contour PS on the original image PO, from the reduced image signal S1. As the irradiation field contour PS' on the reduced image P1, a temporary irradiation field contour PS" is detected by the irradiation field recognizing process means 20. The irradiation field recognizing apparatus 100 further comprises an enlarging process means 30 for simply multiplying the coordinates of a starting point and an end point of each line, which constitutes the temporary irradiation field contour PS", by a scale of enlargement $\beta$, and thereby enlarging the temporary irradiation field contour PS" to a size corresponding to the size on the original image PO before being subjected to the image size reducing process. The irradiation field recognizing apparatus 100 still further comprises an evaluation means 40 for evaluating a degree of conformity of the enlarged temporary irradiation field contour PS" to the original image PO by use of a predetermined evaluation function. The irradiation field recognizing apparatus 100 also comprises an irradiation field contour determining means 50 for determining an irradiation field contour PS"i, which has the highest degree of conformity, in accordance with the results of the evaluation carried out by the evaluation means 40. The irradiation field recognizing apparatus 100 further comprises an input means 60, into which the information representing a scale of reduction $\alpha$ to be used for the image size reducing process in the image size reducing process means 10 is inputted by an operator from the exterior. The input means 60 feeds the information representing the scale of reduction a into the image size reducing process means 10. Also, the input means 60 sets the reciprocal $\beta$ ($=1/\alpha$) of the scale of reduction $\alpha$ as the scale of enlargement $\beta$ and feeds the information representing the scale of enlargement $\beta$ into the enlarging process means 30.

In a modification of the irradiation field recognizing apparatus 100, the scale of reduction $\alpha$, which is to be used for the image size reducing process in the image size reducing process means 10, and the scale of enlargement $\beta$, which is to be used in the enlarging process means 30, may be set previously, such that they cannot be altered. In such a modification, the image size reducing process means 10 stores the scale of reduction $\alpha$ previously, the enlarging process means 30 stores the scale of enlargement $\beta$ previously, and the input means 60 may be omitted.

As the image size reducing process carried out by the image size reducing process means 10, the image signal components of the original image signal PO may be thinned out at predetermined intervals corresponding to the scale of reduction $\alpha$. Alternatively, one of various other processes for reducing the number of the image signal components in accordance with predetermined rules may be employed as the image size reducing process. For example, a process for calculating arithmetic mean values of the image signal components of the original image signal PO and thereafter carrying out a thinning-out operation may be employed as the image size reducing process.

The scale of reduction a in the image size reducing process, expressed in terms of the area ratio, should preferably be at least 1/1,600 (i.e., at least 1/40 in each of the horizontal and vertical directions) and at most 1/16 (i.e., at most 1/4 in each of the horizontal and vertical directions).

In the enlarging process carried out by the enlarging process means 30, in lieu of the size of the entire image being enlarged by increasing the number of the image signal components with interpolating operations, only the coordinates of the starting point and the end point of each line, which constitutes the temporary irradiation field contour PS", are simply multiplied by the scale of enlargement β. In this manner, the temporary irradiation field contour PS", which has been detected from the reduced image P1, is enlarged to a size corresponding to the size on the original image PO before being subjected to the image size reducing process.

The irradiation field recognizing process means 20 carries out the process for recognizing the irradiation field contour PS' from the reduced image P1. The process is not limited to a specific one, and one of already known techniques may be employed. For example, as described above, the technique may be employed, wherein the edge lines corresponding to a rectangular aperture contour of an irradiation field stop are determined by (a) processing a radiation image signal, which represents a radiation image, along the horizontal direction of the radiation image, edge candidate points constituting an edge line being thereby detected, (b) totaling the thus detected edge candidate points along the vertical direction, the position of the edge line, which extends along the vertical direction, with respect to the horizontal direction being thereby found, (c) processing the radiation image signal along the vertical direction, edge candidate points constituting an edge line being thereby detected, and (d) totaling the thus detected edge candidate points along the horizontal direction, the position of the edge line, which extends along the horizontal direction, with respect to the vertical direction being thereby found. Alternatively, the technique may be employed, wherein the edge lines are determined by (a) detecting an edge candidate point from image signal values corresponding to positions along each of a plurality of radial directions, which extend from a predetermined point lying within the irradiation field toward ends of the radiation image, a plurality of edge candidate points being thereby detected with respect to the plurality of the radial directions, and (b) connecting the adjacent edge candidate points. As another alternative, a technique utilizing Hough transform may be employed.

The evaluation means 40 carries out the evaluation of the degree of conformity of the enlarged temporary irradiation field contour PS" to the original image PO. With the evaluation of the degree of conformity, the degree, with which the temporary irradiation field contour PS" having been detected with the process for recognizing the irradiation field coincides with the irradiation field contour PS actually located on the original image PO, is evaluated. Specifically, a plurality of candidates for the irradiation field contour are set within a predetermined range around the enlarged temporary irradiation field contour PS", and the evaluation with the predetermined evaluation function is carried out for each of the candidates for the irradiation field contour. As the evaluation function, one of various kinds of functions may be employed.

For example, as illustrated in FIG. 3, in the evaluation means 40, a candidate line setting means 41 may shift and/or rotate each of four reference candidate lines, which constitute the enlarged temporary irradiation field contour PS", within the range of ±m picture elements and ±θ degrees around the reference candidate line. In this manner, the candidate line setting means 41 may set $\{(2m+1)(2\theta+1)-1\}$ number of transformed candidate lines with respect to each of the reference candidate lines. Also, with respect to each candidate line, which is among the four reference candidate lines and the transformed candidate lines having been set for the four reference candidate lines, an evaluation value calculating means 42 in the evaluation means 40 may carry out operations with a function (1) or a function (2) described below.

(1) A function for, as illustrated in FIG. 4A, calculating differentiated values with respect to each candidate line (i.e., each of the reference candidate lines and the transformed candidate lines), and calculating a mean value of the differentiated values with respect to each candidate line, the mean value being taken with respect to the direction, along which the candidate line extends.

Figure 4B:
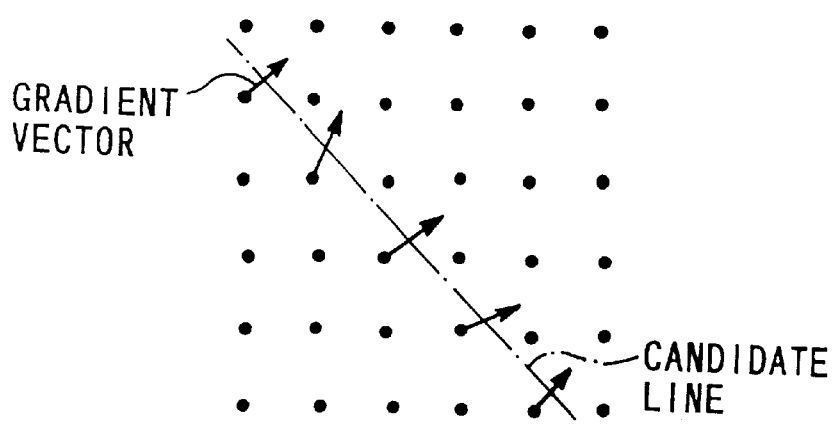
FIG. 4B is an explanatory view showing how an entropy of directions of image density gradient vectors with respect to each candidate line is calculated as an evaluation value.

(2) A function for, as illustrated in FIG. 4B, finding directions of image density gradient vectors with respect to each candidate line, and calculating an entropy of the directions of image density gradient vectors with respect to each candidate line, the entropy being taken with respect to the direction, along which the candidate line extends.

In cases where the function (1) (i.e., the function for calculating the mean value of the differentiated values) is employed in the evaluation value calculating means 42, it is necessary for the irradiation field contour determining means 50 to set the correspondence relationship between the degree of conformity and the mean value of the differentiated values such that the degree of conformity may become high as the mean value of the differentiated values becomes large.

In cases where the function (2) (i.e., the function for calculating the entropy of the directions of image density gradient vectors) is employed in the evaluation value calculating means 42, it is necessary for the irradiation field contour determining means 50 to set the correspondence relationship between the degree of conformity and the entropy of the directions of image density gradient vectors such that the degree of conformity may become high as the entropy of the directions of image density gradient vectors becomes small.

The differentiated value with respect to each candidate line in the former evaluation function (1) is the value of difference between the image signal components representing two picture elements, which stand facing each other with the candidate line intervening therebetween. A large difference value represents that the difference in image density between the two picture elements is large, and that an edge in the image lies between the two picture elements. As illustrated in FIG. 4A, a plurality of sets of the two picture elements, which stand facing each other with the candidate line intervening therebetween, are located in the direction, along which the candidate line extends. (Each set of the two picture elements is surrounded by the broken line in FIG. 4A). Therefore, a plurality of differentiated values are obtained with respect to the plurality of the sets of the two picture elements, the sets being located in the direction, along which the candidate line extends. The differentiated values having been obtained with respect to the sets of the two picture elements, the sets being located in the direction, along which the candidate line extends, are added to one another, and the thus calculated sum is divided by the number of the sets of the two picture elements. In this manner, the mean value described above is calculated. A large mean value represents a strong probability that the candidate line will be the actual edge in the radiation image.

Accordingly, the correspondence relationship between the degree of conformity and the mean value of the differentiated values is set such that the degree of conformity may become high as the mean value of the differentiated values becomes large. In this manner, the candidate line, which has the highest degree of conformity, can be determined as the line constituting the actual irradiation field contour PS.

The image density gradient vector with respect to each candidate line in the latter evaluation function (2) is the vector directed from each of picture elements, which are located on one side of the candidate line, toward the direction, in which the gradient of the image density (i.e., the value of difference in image signal value) is largest. An index value representing the direction, to which the image density gradient vector is directed, is calculated. As the index value, for example, the sine value (sin θ') of an angle θ', which is made between the direction of the image density gradient vector and the direction that is normal to the candidate line, may be employed. As illustrated in FIG. 4B, with respect to the directions of image density gradient vectors from the picture elements located in the direction, along which the candidate line extends, a histogram of the index values is formed. Thereafter, the entropy, $-\Sigma\{(Pi)\log Pi\}$, is calculated from a probability density Pi of the histogram. A small entropy represents that the directions of image density gradient vectors are directed in the same direction. Therefore, there is a strong probability that the candidate line, which is associated with a small entropy, will be the line constituting the actual irradiation field contour on the radiation image. Accordingly, the correspondence relationship between the degree of conformity and the entropy of the directions of image density gradient vectors is set such that the degree of conformity may become high as the entropy of the directions of image density gradient vectors becomes small. In this manner, the candidate line, which has the highest degree of conformity, can be determined as the line constituting the actual irradiation field contour PS.

How the irradiation field recognizing apparatus 100 of FIG. 1 operates will be described hereinbelow with reference to FIGS. 1 through 5F.

Firstly, the original image signal SO, which represents the original image PO and has been detected with a predetermined radiation image read-out apparatus, is fed into the image size reducing process means 10. Also, the information representing the predetermined scale of reduction is fed by the operator into the input means 60. The scale of reduction, expressed in terms of the area ratio, should preferably be at least 1/1,600 (i.e., at least 1/40 in each of the horizontal and vertical directions) and at most 1/16 (i.e., at most 1/4 in each of the horizontal and vertical directions). The scale of reduction, expressed in terms of the area ratio, should more preferably fall within the range of 1/400 to 1/100. In accordance with the received information representing the scale of reduction, the input means 60 feeds the information representing the scale of reduction α into the image size reducing process means 10. Also, the input means 60 calculates the scale of enlargement β, which is the reciprocal of the scale of reduction α, and feeds the information representing the scale of enlargement β into the enlarging process means 30.

Such that the size of the original image PO may be reduced as illustrated in FIG. 5B in accordance with the received scale of reduction α, the image size reducing process means 10 reduces the number of the image signal components of the original image signal SO, which are arrayed in a two-dimensional matrix form, at a predetermined rate along each of the horizontal and vertical directions of the array. The reduced image signal S1 representing the reduced image P1, which is made up of the reduced number of image signal components, is thereby obtained. The reduced image signal S1 is fed into the irradiation field recognizing process means 20.

As the one corresponding to the irradiation field contour PS on the original image PO, the irradiation field contour PS' appears on the reduced image P1. The irradiation field recognizing process means 20 carries out processing for detecting the irradiation field contour PS' from the reduced image P1 by use of one of various known techniques. In this manner, as illustrated in FIG. 5C, the temporary irradiation field contour PS" is detected as the one corresponding to the irradiation field contour PS', which is actually located on the reduced image P1. The information representing the temporary irradiation field contour PS" is fed into the enlarging process means 30. The enlarging process means 30 carries out the enlarging process for enlarging the temporary irradiation field contour PS" in accordance with the scale of enlargement β, which has been received from the input means 60. Specifically, a coordinate signal SS", which represents the temporary irradiation field contour PS" (i.e., only the coordinates of the starting point and the end point of each line constituting the temporary irradiation field contour PS"), is simply multiplied by the reciprocal 1/α of the scale of reduction α.

As a result, as illustrated in FIG. 5D, the temporary irradiation field contour PS" is enlarged to a size corresponding to the size on the original image PO. The temporary irradiation field contour PS" after being enlarged is considered to be approximately identical with the irradiation field contour PS on the original image PO, but will not necessarily coincide with the irradiation field contour PS on the original image PO.

Therefore, as illustrated in FIG. 5E, a plurality of candidate lines, which are considered to approximately represent the enlarged temporary irradiation field contour PS", are set around the enlarged temporary irradiation field contour PS" and in the vicinity of it. Specifically, the coordinate signal SS", which represents the enlarged temporary irradiation field contour PS", is fed into the candidate line setting means 41 of the evaluation means 40. The candidate line setting means 41 takes the four straight lines, which constitute the enlarged temporary irradiation field contour PS", as the reference candidate lines. Also, as illustrated in FIG. 3, the candidate line setting means 41 shifts and/or rotates each of the four reference candidate lines within the range of ±m picture elements and ±θ degrees around the reference candidate line. In this manner, the candidate line setting means 41 sets $\{(2m+1)(2\theta+1)-1\}$ number of transformed candidate lines with respect to each of the reference candidate lines.

The signal, which represents the four reference candidate lines and $\{(2m+1)(2\theta+1)-1\}$ number of transformed candidate lines having been set for each of the four reference candidate lines, is fed into the evaluation value calculating means 42.

In this embodiment, the evaluation value calculating means 42 employs the function for calculating the differentiated values with respect to each candidate line (i.e., each of the reference candidate lines and the transformed candidate lines), and calculating the mean value of the differentiated values with respect to each candidate line, the mean value being taken with respect to the direction, along which the candidate line extends.

The evaluation value calculating means 42 carries out the operations described below with respect to each of the four directions, along which the four reference candidate lines extend. Specifically, as illustrated in FIG. 4A, as for each candidate line, which is among each reference candidate line and the transformed candidate lines having been set for the reference candidate line), the evaluation value calculating means 42 calculates the value of difference between the image signal components representing two picture elements, which stand facing each other with the candidate line intervening therebetween. A plurality of sets of the two picture elements, which stand facing each other with the candidate line intervening therebetween, are located in the direction, along which the candidate line extends. Therefore, a plurality of the difference values are obtained with respect to the plurality of the sets of the two picture elements, the sets being located in the direction, along which the candidate line extends. The evaluation value calculating means 42 adds the difference values having been obtained with respect to the sets of the two picture elements, the sets being located in the direction, along which the candidate line extends. The evaluation value calculating means 42 then divides the thus calculated sum by the number of the sets of the two picture elements and thereby calculates the mean value described above. A large mean value represents a strong probability that the candidate line will be the actual edge in the radiation image, and the edge, which is associated with the largest difference in image density (or in luminance), is the line constituting the irradiation field contour.

In the manner described above, the mean value of the difference values (i.e., the differentiated values) is obtained as the evaluation value with respect to each candidate line. The signal, which represents the candidate lines, and the information representing the corresponding evaluation values are fed into the irradiation field contour determining means 50.

With respect to each of the four directions, along which the four reference candidate lines extend, the irradiation field contour determining means 50 selects a single candidate line, which has the largest evaluation value, from the group of the candidate lines having been set for each of the four directions. In this manner, four candidate lines, which have the largest evaluation values, are selected. As illustrated in FIG. 5F, the thus selected candidate lines are determined as the four lines, which constitute the irradiation field contour PS.

The signal, which represents the thus determined irradiation field contour, is fed into, for example, an external image processing unit and subjected to, for example, a blackening process, with which the region outward from the irradiation field contour is rendered to have the highest image density.

As described above, with this embodiment of the apparatus for recognizing an irradiation field on a radiation image in accordance with the present invention, the process for recognizing irradiation field is carried out on the reduced image, which has been obtained by carrying out the image size reducing process on the original image. Therefore, the number of the image signal components of the image signal to be processed can be kept markedly small, and the time required to carry out the process for recognizing the irradiation field can be kept markedly short.

Also, errors occurring from the carrying out of the recognition process on the reduced image can be approximately eliminated by setting the plurality of candidates for the irradiation field contour around the temporary irradiation field contour and within the range, which is considered to contain the true irradiation field contour, and making evaluation with respect to each of the candidates for the irradiation field contour by the utilization of the predetermined evaluation value, which is indicative of the aforesaid errors. Therefore, the accuracy, with which the irradiation field is recognized, can be kept to be equivalent to the accuracy obtained with the conventional method of recognizing an irradiation field.

In this embodiment, the evaluation value calculating means 42 employs the function for calculating the differentiated values with respect to each candidate line (i.e., each of the reference candidate lines and the transformed candidate lines), and calculating the mean value of the differentiated values with respect to each candidate line, the mean value being taken with respect to the direction, along which the candidate line extends. Alternatively, the evaluation value calculating means 42 may employ the function for calculating the entropy of the directions of image density gradient vectors. With the function for calculating the entropy of the directions of image density gradient vectors, the vector (i.e., the image density gradient vector) directed from each of picture elements, which are located on one side of each candidate line, toward the direction, in which the value of difference in image signal value is largest, is set. Also, an index value representing the direction, to which the image density gradient vector is directed, is calculated. As the index value, for example, the sine value (sin θ') of an angle θ', which is made between the direction of the image density gradient vector and the direction that is normal to the candidate line, may be employed. Further, as illustrated in FIG. 4B, with respect to the directions of image density gradient vectors from the picture elements located in the direction, along which the candidate line extends, a histogram of the index values is formed. Thereafter, the entropy, $-\Sigma\{(Pi)\log Pi\}$, is calculated from a probability density Pi of the histogram. The thus calculated entropy is employed as the evaluation value. In such cases, it is necessary for the irradiation field contour determining means 50 to be set such that, with respect to each of the four directions, along which the four reference candidate lines extend, a single candidate line having the smallest entropy may be selected and determined as the line constituting the irradiation field contour.

The method and apparatus for recognizing an irradiation field on a radiation image in accordance with the present invention is not limited to the embodiment described above and may be embodied in various other ways. Also, the evaluation means is not limited to the evaluation means 40 described above and may be constituted as one of various other kinds of means.

Further, the image signal given to the method and apparatus for recognizing an irradiation field on a radiation image in accordance with the present invention is not limited to the original image signal SO and may be a reduced image signal S1 representing an image, which has already been reduced for obtaining desired characteristics. (For example, the image signal may be the one having been detected with a preliminary read-out operation for reading out a radiation image with respect to picture elements larger than those of a final read-out operation before the final read-out operation is carried out. The preliminary read-out operation is carried out in order for a dynamic range of the radiation image, which has been stored on a stimulable phosphor sheet, or the like, to be ascertained approximately.) In such cases, as illustrated in FIG. 6, an irradiation field recognizing apparatus 100' may be employed, wherein the image size reducing process means 10 of the irradiation field recognizing apparatus 100 shown in FIG. 1 is omitted, and wherein the input means 60 is replaced by an input means 60' which does not feed out the information representing the scale of reduction α. (The input means 60' may be omitted.)

What is claimed is:

1. A method of recognizing an irradiation field on a radiation image, in which an original image signal representing an original radiation image is obtained, the original radiation image having been recorded by use of an irradiation field stop and having an irradiation field thereon, and a process for recognizing the irradiation field is carried out, the irradiation field being determined in accordance with the original image signal, the method comprising the steps of:

i) carrying out an image size reducing process on the original radiation image represented by the original image signal, a reduced image signal representing a reduced image being thereby obtained, ii) carrying out the process for recognizing the irradiation field, the process being carried out on said reduced image signal representing said reduced image, which has been obtained from said reducing process, a temporary irradiation field contour being thereby detected, iii) carrying out an enlarging process for enlarging said temporary irradiation field contour to a size corresponding to the size on the original radiation image before being subjected to said reducing process, an enlarged temporary irradiation field contour being thereby obtained, iv) evaluating a degree of conformity of said enlarged temporary irradiation field contour to the original radiation image by use of a predetermined evaluation function, and v) determining an irradiation field contour, which has the highest degree of conformity, in accordance with the results of said evaluation.

2. A method as defined in claim 1 wherein said predetermined evaluation function is a function for shifting and/or rotating each of reference candidate lines, which constitute said enlarged temporary irradiation field contour, within the range of ±m picture elements and ±θ degrees around the reference candidate line, thereby setting $\{(2m+1)(2\theta+1)-1\}$ number of transformed candidate lines with respect to each of said reference candidate lines, calculating differentiated values with respect to each candidate line, which is among said reference candidate lines and said transformed candidate lines having been set for said reference candidate lines, and calculating a mean value of said differentiated values with respect to each candidate line, said mean value being taken with respect to the direction, along which the candidate line extends, and correspondence relationship between said degree of conformity and said mean value of said differentiated values is set such that said degree of conformity may become high as said mean value of said differentiated values becomes large.

3. A method as defined in claim 1 wherein said predetermined evaluation function is a function for shifting and/or rotating each of reference candidate lines, which constitute said enlarged temporary irradiation field contour, within the range of ±m picture elements and ±θ degrees around the reference candidate line, thereby setting $\{(2m+1)(2\theta+1)-1\}$ number of transformed candidate lines with respect to each of said reference candidate lines, finding directions of image density gradient vectors with respect to each candidate line, which is among said reference candidate lines and said transformed candidate lines having been set for said reference candidate lines, and calculating an entropy of said directions of image density gradient vectors with respect to each candidate line, said entropy being taken with respect to the direction, along which the candidate line extends, and correspondence relationship between said degree of conformity and said entropy of said directions of image density gradient vectors is set such that said degree of conformity may become high as said entropy of said directions of image density gradient vectors becomes small.

4. An apparatus for recognizing an irradiation field on a radiation image, in which an original image signal representing an original radiation image is obtained, the original radiation image having been recorded by use of an irradiation field stop and having an irradiation field thereon, and a process for recognizing the irradiation field is carried out, the irradiation field being recognized in accordance with the original image signal, the apparatus comprising:

i) an image size reducing process means for carrying out an image size reducing process on the original radiation image represented by the original image signal, a reduced image signal representing a reduced image being thereby obtained, ii) an irradiation field recognizing process means for carrying out the process for recognizing the irradiation field, the process being carried out on said reduced image signal representing said reduced image, which has been obtained from said reducing process, a temporary irradiation field contour being thereby detected, iii) an enlarging process means for carrying out an enlarging process for enlarging said temporary irradiation field contour to a size corresponding to the size on the original radiation image before being subjected to said reducing process, an enlarged temporary irradiation field contour being thereby obtained, iv) an evaluation means for evaluating a degree of conformity of said enlarged temporary irradiation field contour to the original radiation image by use of a predetermined evaluation function, and v) an irradiation field contour determining means for determining an irradiation field contour, which has the highest degree of conformity, in accordance with the results of said evaluation.

5. An apparatus as defined in claim 4 wherein said evaluation means comprises:

a) a candidate line setting means for shifting and/or rotating each of reference candidate lines, which constitute said enlarged temporary irradiation field contour, within the range of ±m picture elements and ±θ degrees around the reference candidate line, and thereby setting $\{(2m+1)(2\theta+1)-1\}$ number of transformed candidate lines with respect to each of said reference candidate lines, and b) an evaluation value calculating means for calculating differentiated values with respect to each candidate line, which is among said reference candidate lines and said transformed candidate lines having been set for said reference candidate lines, and calculating a mean value of said differentiated values with respect to each candidate line, said mean value being taken with respect to the direction, along which the candidate line extends, and said irradiation field contour determining means sets correspondence relationship between said degree of conformity and said mean value of said differentiated values such that said degree of conformity may become high as said mean value of said differentiated values becomes large.

6. An apparatus as defined in claim 4 wherein said evaluation means comprises:

a) a candidate line setting means for shifting and/or rotating each of reference candidate lines, which constitute said enlarged temporary irradiation field contour, within the range of ±m picture elements and ±θ degrees around the reference candidate line, and thereby setting $\{(2m+1)(2θ+1)-1\}$ number of transformed candidate lines with respect to each of said reference candidate lines, and b) an evaluation value calculating means for finding directions of image density gradient vectors with respect to each candidate line, which is among said reference candidate lines and said transformed candidate lines having been set for said reference candidate lines, and calculating an entropy of said directions of image density gradient vectors with respect to each candidate line, said entropy being taken with respect to the direction, along which the candidate line extends, and said irradiation field contour determining means sets correspondence relationship between said degree of conformity and said entropy of said directions of image density gradient vectors such that said degree of conformity may become high as said entropy of said directions of image density gradient vectors becomes small.

\* \* \* \* \*